Feb. 21, 1939.  H. L. GERHART ET AL  2,148,116

OLEFIN POLYMERIZATION

Filed June 19, 1936  4 Sheets-Sheet 1

INVENTORS
Howard L. Gerhart
Maurice H. Arveson
BY
ATTORNEY

Feb. 21, 1939. H. L. GERHART ET AL 2,148,116
OLEFIN POLYMERIZATION
Filed June 19, 1936 4 Sheets—Sheet 3

INVENTORS
Howard L. Gerhart
Maurice H. Arveson
BY J. Russell Wilson
ATTORNEY

Feb. 21, 1939.  H. L. GERHART ET AL  2,148,116
OLEFIN POLYMERIZATION
Filed June 19, 1936  4 Sheets-Sheet 4

INVENTORS
Howard L. Gerhart
Maurice H. Arveson
BY
ATTORNEY

Patented Feb. 21, 1939

2,148,116

UNITED STATES PATENT OFFICE 2,148,116

OLEFIN POLYMERIZATION

Howard L. Gerhart, Philadelphia, Pa., and Maurice H. Arveson, Chicago, Ill., assignors to Standard Oil Company, Chicago, Ill., a corporation of Indiana Application June 19, 1936, Serial No. 86,077

15 Claims. (Cl. 196—10)

This invention relates to the polymerization of an admixture of olefin-containing hydrocarbons and, particularly, the normally gaseous olefinic hydrocarbons containing the butylenes such as n-butylene and isobutylene. Admixtures of gases containing the butylenes and propylene are particularly adapted for polymerization by our process and we may use an admixture of gases comprising mostly butylenes and propylene as the unsaturated constituents. Gases containing butane, the butylenes and propylene, are also adapted for polymerization by our invention. These gases may be derived from any suitable source such as the unsaturated gases produced by the cracking of hydrocarbon oils for the manufacture of gasoline. Products from the debutanizer reflux drum of a cracking unit are particularly desirable.

The object of our invention is to provide improved systems for preventing loss of boron fluoride, boron chloride or similar catalytic material which is used to effect the polymerization. A further object is to provide a method and means for increasing the yields of polymerization products falling within the gasoline boiling range in processes employing normally gaseous olefines such as butylenes and propylene. A further object is to provide improved means for preventing the loss of boron fluoride from the system and for recovering and recycling boron fluoride in a closed system. A further object is to provide an improved arrangement of reaction chambers, heat exchangers, fractionating devices, scrubbers and catalyst recovery apparatus whereby maximum yields of desirable polymers may be obtained at a minimum cost. A further object is to provide systems for initially employing high polymerization temperatures followed by the formation of boron fluoride complexes at lower temperatures and subsequent recovery of boron fluoride by a high temperature treatment. Other objects will be apparent as the detailed description of the invention proceeds.

We have discovered that boron halides, such as boron trifluoride and boron trichloride polymerize a substantial quantity of the unsaturated hydrocarbons present in an admixture of hydrocarbon gases with the attendant formation of an unknown type of reaction product between the boron halide, and the hydrocarbons undergoing polymerization and that this boron halide-hydrocarbon-complex will decompose at elevated temperatures into two products, namely, boron halide and hydrocarbons. We prefer to use $BF_3$ and our invention will be described with reference to it.

The boron fluoride recovered from the boron fluoride-hydrocarbon-complex is reused in the process and the hydrocarbon is recovered along with the other polymers, a substantial portion of which boil within the gasoline boiling range.

Our invention will be more clearly understood from the accompanying drawings which form a part of this disclosure and in which.

Figure 1:
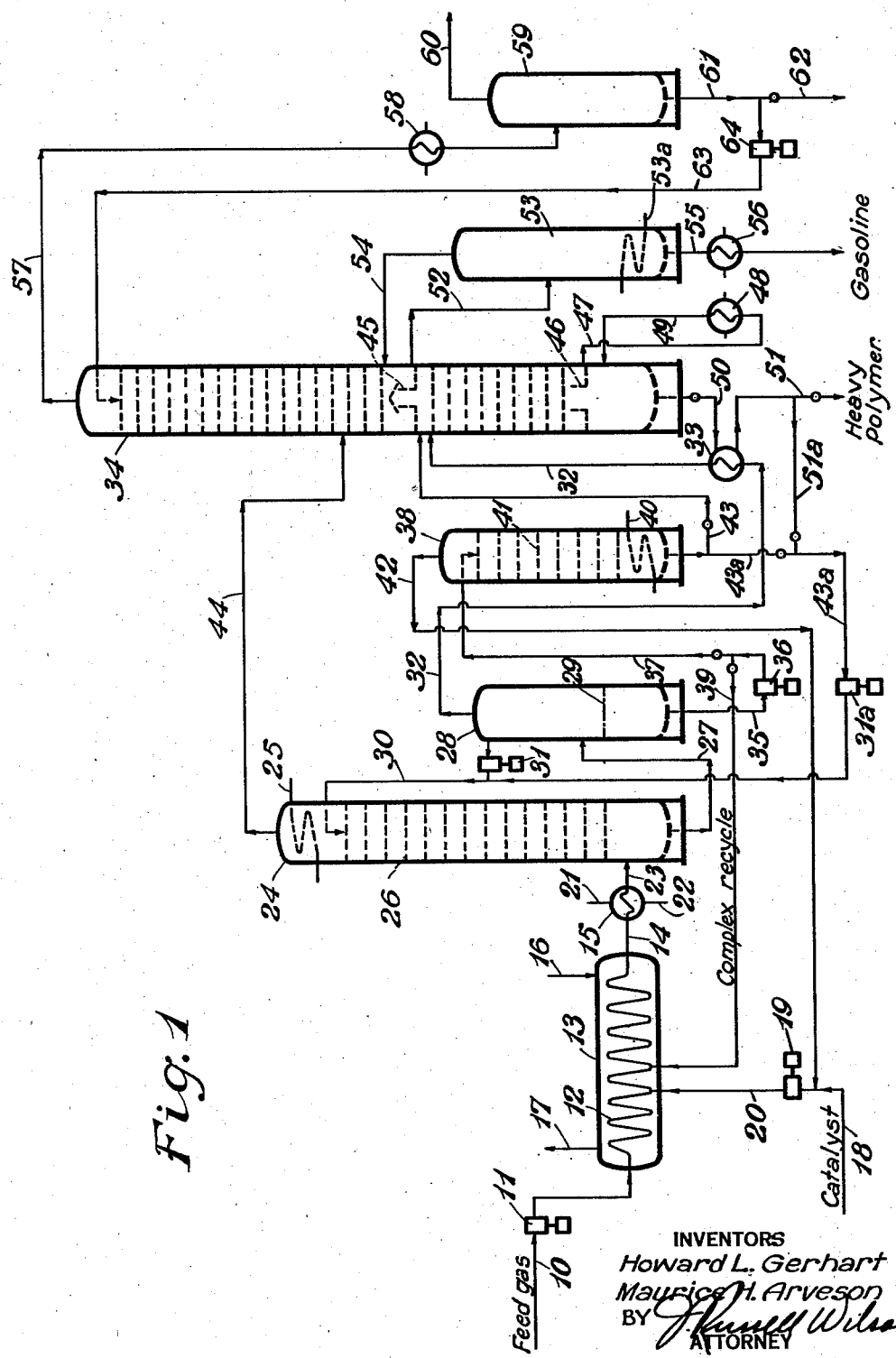
Figure 1 is a diagrammatic elevational plan or flow sheet of a preferred embodiment of our invention.

Referring to Figure 1, gases containing olefins, preferably an admixture of gases containing propylene and butylenes as the predominating constituents, in either the gas or liquid state, enter the system through line 10, are raised by compressor or pump 11 to the desired pressure, passed through the coils 12 in the temperature regulator 13 and then passed by line 14 to the cooler 15. Steam, hot oil or any suitable heating or cooling medium may be circulated around the heating coils 12 in the temperature regulator 13 by aid of conduits 16 and 17 for the purpose of heating the feed gases in the coils to a temperature within the range of 300 to 700° F. The pressure maintained within the coils 12 may vary from 20 to 500 lbs. per square inch gage.

Gaseous boron fluoride enters the system through conduit 18, is raised to the desired pressure by the compressor 19 and passed by line 20 into the coils 12. We prefer to introduce the catalyst into coils 12 at a point intermediate the two ends of the temperature regulator (exchanger for controlling reaction temperatures) 13. By this method, the feed gases entering the system are heated up to a temperature between 300 and 700° F. before they are brought into contact with the boron fluoride. Usually about one-third of the coils 12 are employed for the purpose of preheating the gases as described but of course this may be varied. Under the conditions maintained in the coils 12, the boron fluoride polymerizes a substantial proportion of the unsaturated gases into normally liquid polymers, a substantial proportion of which boils within the gasoline boiling range, namely, below about 420–410° F. The boron fluoride hydrocarbon complex is unstable at temperatures above about 250, particularly at temperatures above 300° F. and by operating the temperature regulator 13 at temperatures above 300° F. this complex is not formed in coils 12; however, it is formed in other parts of our process as hereinafter described.

The cooler 15 reduces the temperature of the products passing therethrough to about 200° F. or lower so that the boron fluoride-hydrocarbon complex will be formed with some of those unsaturated hydrocarbons which escape polymerization in the coils 12. Any suitable cooling medium may be circulated through the cooler 15 with the aid of conduits 21 and 22 for the purpose of maintaining the desired temperature in the cooler. We have found it desirable to operate cooler 15 at temperatures within the range of 90° to 200° F.

The products pass from cooler 15 by conduit 23 to the lower part of the tower 24 which may be called a scrubber. The temperature in tower 24 is maintained below 200° F. and usually within the range of 90° to 200° F. and in this tower the boron fluoride gas and unsaturated gases which escape polymerization in the previous part of our process are permitted to rise up through the tower where they are contacted with polymers in a manner to be described later and there react to form the boron fluoride-hydrocarbon complex. We prefer to maintain a temperature gradient in tower 24 ranging from 200° F. or lower in the bottom part of the tower to about 100° F. or lower in the top part of the tower. A cooler 25 may be provided in the top part of the tower in order to maintain the desired temperature. A portion of the unreacted gases, particularly some of the saturated gases that were present in the feed stock, may pass overhead from tower 24. Baffle plates or any suitable means 26 may be placed in the tower 24 in order to insure intimate contact between the boron fluoride gas and unsaturated hydrocarbons. At the temperature maintained in tower 24, none of the polymers or boron fluoride-hydrocarbon complex passes overhead.

The liquid products are withdrawn from the bottom of tower 24 through conduit 27 and passed to the separator 28 where the polymers and liquefied constituents are permitted to separate from the boron fluoride-hydrocarbon complex. The later compound being heavier than, and immiscible with, the liquid polymers, settles to the bottom part of separator 28, the interface being shown by the line 29. A portion of the liquid hydrocarbons is withdrawn from the top part of the separator through line 30 with the aid of pump 31 and returned to the top part of tower 24 to be passed down through the tower and react with boron fluoride to form the boron fluoride-hydrocarbon complex. If desired, a cooler may be placed in line 30 in order to assist in maintaining the desired temperature in the top part of tower 24. Other materials available in the system may be used in tower 24 to contact boron fluoride to form the boron fluoride-hydrocarbon complex. For example, hydrocarbons from decomposed complex to be described later are picked up by pump 31a, are sent through line 30 into tower 24. Likewise, a heavy polymer fraction to be described later, may be used. The remainder of the free polymers and unreacted feed in the upper part of the separator 28 are withdrawn through line 32 and passed to the heat exchanger 33 and are then introduced into the fractionating tower 34.

The boron fluoride-hydrocarbon complex in the lower part of separator 28 is withdrawn through line 35 with the aid of pump 36 and passed by valved conduit 37 to the top part of the stripper 38 or passed by valved conduit 39 to an intermediate section of the coils 12 in the temperature regulator 13. If desired, a portion of the boron fluoride-hydrocarbon complex may be passed through valved conduit 37 and the other portion passed through valved conduit 39. At the temperatures maintained in temperature regulator 13 the complex is decomposed into boron fluoride and a free polymer. This boron fluoride then assists in the polymerization of the feed stock. We prefer to introduce the boron fluoride-hydrocarbon complex into coil 12 at about the same point where the initial charge of boron fluoride gas enters the coils.

The temperature in stripper 38 is maintained above 200° F. and preferably within the range of 250–350° F. so that the boron fluoride-hydrocarbon complex will be decomposed into boron fluoride gas and free polymer. Heating coils 40 are provided in the bottom part of tower 38 so as to maintain the desired temperature therein and fractionating means such as baffle plates and trays 41 may be provided in tower 38 so as to assist in the efficient decomposition of the complex. The boron fluoride gas liberated from the complex is withdrawn from the top of the heater 38 through line 42 and returned to line 20 where it is again introduced into the coils 12. The liquid polymers in the lower part of the heater or stripper 38 are withdrawn through valved conduit 43 and passed to about the middle portion of the fractionating tower 34 or a portion or all may be sent through line 43a, pump 31a, line 30 to tower 24 as previously described.

The fractionating tower 34 is of the conventional type and is operated in a manner well known to the art. The unreacted hydrocarbon gases, largely saturated hydrocarbon gases, which pass overhead from tower 24 through line 44, enter the fractionating tower above the middle portion thereof. The free polymers and balance of the unreacted fed recovered in the top part of the separator 28 are passed by line 32 to the fractionating tower, preferably entering the fractionating tower below the trap-out plate 45. Trap-out plate 46 is provided in the lower part of the tower and the heavy polymers are withdrawn therefrom by conduit 47, passed to the reboiler 48 and then returned by line 49 to the bottom part of the tower. The reboiler provides sufficient heat to effect the desired fractionation in tower 34. The heavy polymers, generally those polymers boiling above the gasoline boiling range, are withdrawn from the bottom of fractionating tower 34 through valved conduit 50, passed through the heat exchanger 33 and then are passed to storage through line 51 and a portion of this stream may be sent through line 51a, line 43a, pump 31a, line 30 to tower 24 where it is used to react with boron fluoride to form the boron fluoride-hydrocarbon complex and/or provide cooling as previously described. The hydrocarbons withdrawn from trap-out plate 45 pass through line 52 to the side stripper 53 which is designed to separate the low boiling hydrocarbons from the polymers boiling within the gasoline boiling range. The vapors are withdrawn from the top of the side stripper through conduit 54 and returned to the tower at a point above the trap-out plate 45. A heating coil 53a is provided in the lower part of the side stripper in order to supply heat for the fractionation. The polymers boiling within the gasoline boiling range are withdrawn from the bottom of the side stripper through line 55, cooler 56 and then passed to storage. These hydrocarbons are made up mostly of dimers and trimers produced by the polymerization reaction. They may be used as such as motor fuels or blended with straight run or cracked gasolines in order to raise their anti-knock value.

The overhead from fractionating tower 34 consists mostly of low boiling hydrocarbons which are usually too light for use in motor fuels. These products pass through line 57 to the cooler 58 and thence to the separator reflux drum 59. The uncondensed gases are removed from the top of the separator through line 60 and the products which liquefy are withdrawn from the bottom thereof through line 61 and valved conduit 62. A portion of the liquefied constituent in line 61 is passed through line 63 with the aid of pump 64 and returned to the top of the fractionating tower 34 for use as reflux.

The amount of boron fluoride employed to polymerize the unsaturated hydrocarbons may vary over a wide range, but generally from about 0.002 to 0.1 cubic foot of boron fluoride should be present in the coils 12 for each cu. ft. of gas, measured at 60° F., introduced therein. Since the boron fluoride-hydrocarbon complex is broken down into boron fluoride and polymer, we are able to recycle this boron fluoride and thereby avoid the necessity of continuously adding boron fluoride catalyst to the system through line 18. Small amounts of boron fluoride may be added at intervals to compensate for losses. A time of contact from one second or a few seconds or about one minute to 10 minutes may be used in coils 12.

Since boron fluoride is corrosive, we prefer to use a non-corrosive alloy lining in the equipment used in the process in order to minimize corrosion. If desired, the gases in line 44 and the liquid polymers in lines 43 and 32 may be washed with an absorbing agent such as water, alkaline solutions, aqueous ammonia, etc. for the purpose of removing boron fluoride.

It is apparent from the foregoing description of our catalytic polymerization process that an admixture of hydrocarbons containing unsaturated hydrocarbons, particularly the butylenes and propylene, can be polymerized into hydrocarbon motor fuels without resorting to very high temperatures and pressures. By operating the temperature regulator 13 within the range of temperatures hereinbefore specified, we have found that a high yield of hydrocarbons of high anti-knock rating boiling within the gasoline boiling range are produced by our process.

Figure 2:
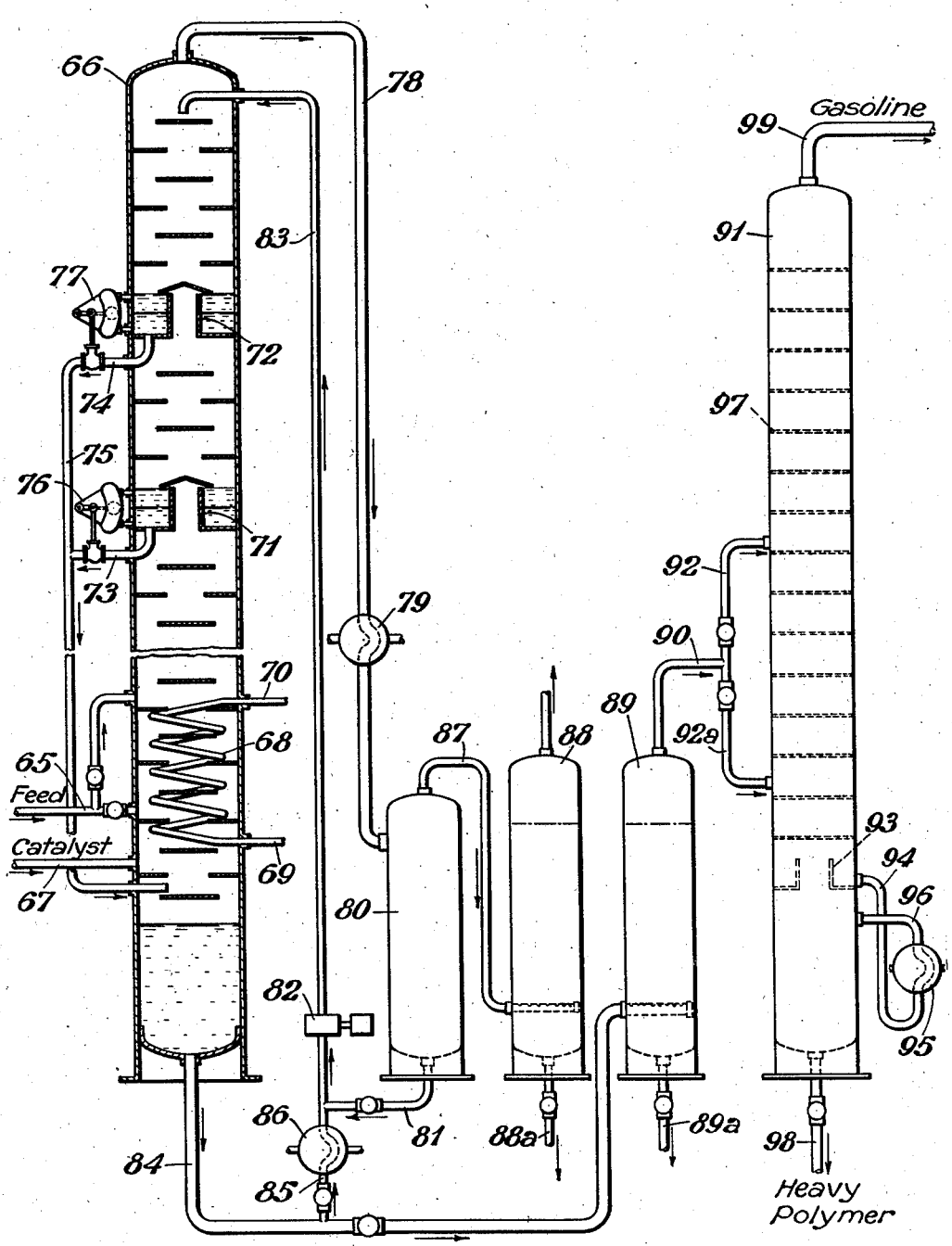
Figure 2 is a flow diagram of another modification with parts shown in vertical section of a similar system employing an improved reaction tower.

Referring to Figure 2, the feed gases enter the system through valved conduit 65 and are passed into the lower portion of tower 66. Boron fluoride gas enters the tower 66 through line 67 at a point near but below the inlet line 65. Hot oil, steam or any suitable heating or cooling medium is passed through the coils 68 by aid of conduits 69 and 70 in order to maintain the temperature of the reaction zone in the lower part of the tower within the range of 300 to about 500° F. Within this range of temperatures the boron fluoride polymerizes the unsaturated constituents in the charging stock into higher boiling hydrocarbons without the formation of a stable boron fluoride-hydrocarbon complex. The pressure in tower 66 is maintained within the range of about 100–500 lbs. per square inch and under the temperature and pressure conditions maintained in tower 66, the polymers form in the reaction zone, condense and pass to the bottom of the tower as indicated by the drawings. The unreacted gases and boron fluoride rise up through the tower into zones maintained at progressively lower temperatures. The top of tower 66 is maintained at a temperature below 150° F. and preferably within the range of 50–100° F. The boron fluoride and unreacted gases which pass from the reaction zone to the upper part of the tower continue to react and form higher boiling hydrocarbons but at temperatures below 200° F., a boron fluoride-hydrocarbon complex is formed and trap-out plates 71 and 72 are provided in tower 66, usually at points up above the middle section, for the purpose of collecting the boron fluoride-hydrocarbon complex. As this complex is collected by the trap-out plates it is withdrawn through lines 73 and 74 and passed by line 75 back to the lower part of the tower and is introduced, preferably below the feed point, into the zone maintained at a temperature above about 300° F. This recycled boron fluoride-hydrocarbon complex decomposes into free polymer and boron fluoride. The boron fluoride again rises up the tower and reacts with those olefinic constituents used as reflux and/or those which escaped polymerization in the lower part of the tower. By this means the boron fluoride is permitted to circulate through the tower and polymerize a high percentage of the polymerizable constituents in the feed gases. Float valves 76 and 77 are provided in lines 73 and 74 for the purpose of maintaining a liquid level on the trap-out plates 71 and 72. Bubble trays or baffles may be placed in tower 66 in order to assist in the fractionation of the constituents therein and promote a more efficient polymerization reaction.

The unpolymerized hydrocarbons, such as propane and butane, which may be present in the feed gases, pass from the top of tower 66 through line 78 to the cooler 79 and thence to the reflux drum 80 where the condensed hydrocarbons are withdrawn from the bottom through valved conduit 81 by pump 82 and returned to the top of the tower through line 83 and used as reflux. An inter-cooler or reflux coils may be provided in the top part of tower 66 in order to maintain the desired temperature in the upper zone of the tower. A part of the polymer withdrawn from the bottom of tower 66 through line 84 is passed through valved conduit 85 to the cooler 86 and then joined with the products in line 83 for use as reflux. The polymer or reflux will react with boron fluoride in the gases passing up the tower forming boron fluoride-hydrocarbon complex and will also assist in maintaining the desired temperature in the upper part of tower 66.

The gases removed overhead from reflux drum 80 are passed through line 87 to the lower part of a scrubber 88 where they are washed with an absorbing agent, previously described, to remove the traces of boron fluoride remaining in the gases. The gases from the overhead of the washer 88 may be used as fuel gases or disposed of in any convenient way. A valved draw-off and charge line 88a is provided in the lower part of the washer 88. The liquid polymers withdrawn from the bottom of tower 66 through valved conduit 84 are passed to the bottom of the scrubber 88 and there permitted to pass up through water or other absorbing agent where any traces of boron fluoride are removed. A valved draw-off and charge line 89a is provided at the bottom of the scrubber 89.

The liquid polymers which rise to the top of the aqueous medium in washer 89 are withdrawn through conduit 90 and passed to the fractionating tower 91 through valved conduits 92 and 92a. Fractionating tower 91 is of conventional construction and is operated so as to cut the polymer into a fraction boiling within the gasoline range and a heavier fraction. Liquids in the lower part of fractionating tower 91 are withdrawn from trap-out plate 93 through conduit 94 and passed to the reboiler 95 and then returned to the lower part of the tower through line 96. The heat supplied by the reboiler 95 permits the polymers in tower 91 to be fractionated as above indicated and baffle plates or trays 97 are employed in the fractionating tower 91. The heavy polymers, usually those hydrocarbons boiling above about 420° F. are withdrawn from the bottom of fractionating tower 91 through valved conduit 98 and the lower boiling hydrocarbons are removed from the top of the fractionating tower through conduit 99. The fraction of hydrocarbons withdrawn from line 99 may be blended with straight run or cracked gasoline and used as a motor fuel. A portion of the heavy polymer from line 98 may be recycled to tower 66 through line 83 and other lines not shown for the same purposes as described in connection with the material from line 84.

Since the boron fluoride-hydrocarbon complex is broken down in the operation of tower 66 into boron fluoride and polymer, we are able to recycle the boron fluoride and thereby avoid the necessity of continuously adding boron fluoride catalyst to the system through conduit 67. However, small amounts of boron fluoride may be added to compensate for losses. The amount of boron fluoride employed to polymerize the unsaturated hydrocarbons may vary over a wide range, but generally from about .002 to .100 cu. ft. of boron fluoride gas should be present in tower 66 for each cu. ft. of reaction space therein.

Figure 3:
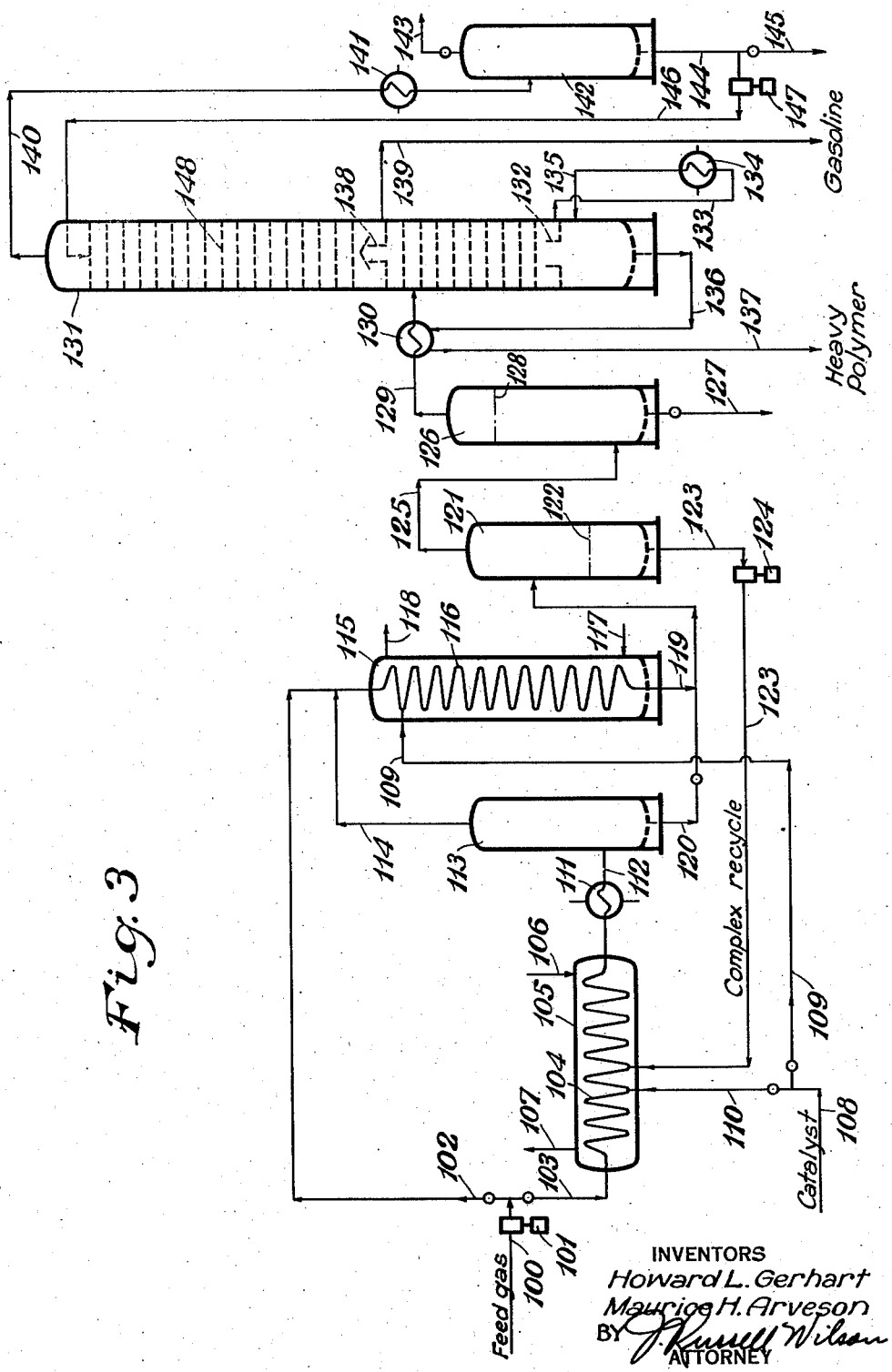
Figure 3 is a flow diagram of a further modification of the general type of system shown in Figure 1, but with the employment of a second low temperature polymerization step.

Referring to Figure 3, gases containing olefins, preferably an admixture of gases containing propylene and butylenes as the predominating constituents available in either the gaseous or liquid state, enter the system through line 100, are raised by compressor pump 101 to the desired pressure and split between valved conduits 102 and 103. The feed gases in line 103 pass through the coils 104 in the temperature regulator 105 where they are heated to a temperature within the range of 300-700° F. Any suitable heating means such as stream or hot oil is circulated through the temperature regulator 105 with the aid of conduits 106 and 107. The catalyst, boron fluoride, enters the system through line 108 and is split into two streams by valved conduits 109 and 110. The boron fluoride gas in line 110 passes to the coils 104 at a point intermediate the two ends of the temperature regulator 105. By introducing the catalyst into coils 104 at a point down stream, the first part of the coil 104 serves as a heater for the feed gases. The boron fluoride polymerizes the unsaturated hydrocarbons in the feed gases into higher boiling hydrocarbons and the reaction products from the coils 104 pass to the cooler 111 which lowers the temperature of the reaction products to about 200° F. or lower.

The cooled products then pass from the cooler through line 112 to the separator 113 where the free polymers, along with a portion of the boron fluoride-hydrocarbon complex formed in the process separate as a liquid product. The boron fluoride and unpolymerized gases pass from the top of the separator 113 through line 114 and enter the second temperature regulator 115 which is operated at a temperature below 200° F. and preferably within the range of 200-90° F. The products in line 114 join a portion of the feed gases passed through line 102 and the admixture passes into the coils 116 where the polymerization reaction is continued. At temperatures below 200° F. the boron fluoride forms the complex. Any suitable temperature controlling medium may be circulated around the coils 116 in the temperature regulator with the aid of conduits 117 and 118. If desired, an additional quantity of boron fluoride may be introduced into the coils 116 through conduit 109, but this is not preferred.

The effluent from coils 116 is withdrawn through line 119 and mixed with the liquid products withdrawn from the bottom of separator 113 through valved conduit 120. The valve in conduit 120 controls the liquid level in separator 113. The admixture of the products from lines 119 and 120 pass to the liquid separator 121 and there permitted to separate into liquid polymers and the boron fluoride-hydrocarbon complex. Usually a liquid level, as indicated by line 122, is maintained in the lower part of the separator below the point where the products enter the separator. The boron fluoride-hydrocarbon complex is withdrawn from the bottom part of the separator through conduit 123 with the aid of pump 124 and returned to an intermediate portion of the coils 104 in temperature regulator 105. At the high temperature maintained in the coils 104, this complex is decomposed into liquid polymer and boron fluoride gas. The latter reacts with the polymerizable constituents in the feed stock and repeats the cycle.

The liquid polymers and unreacted constituents in the upper part of separator 121 are withdrawn therefrom by line 125 and introduced into the lower part of the tower 126 where the products are permitted to rise through an absorbing agent that will absorb the trace of boron fluoride in the products withdrawn through line 125. Since boron fluoride is soluble in water, the products in tower 126 may be scrubbed with water in order to remove the entrained boron fluoride. A valved draw-off 127 is provided in the lower part of the washer 126. The line 128 indicates the liquid level maintained therein when a solution is used to neutralize or remove the boron fluoride from the products therein. The products are withdrawn from the top of tower 126 through line 129 to the heater 130 and then introduced into the fractionating tower 131. The fractionating tower is of the conventional type and may be operated in a manner well known to the art. Usually the products in line 129 are introduced into the tower at a point below the trap-out plate used for withdrawing the hydrocarbons or polymers boiling within the gasoline range.

A trap-out tray 132 is provided in the lower part of the tower 131 and the heavy products are withdrawn through line 133 and passed to the reboiler 134 and then returned to the bottom of the tower through line 135. The reboiler provides sufficient heat for the operation of the tower 131. The heavy polymers, usually those polymers boiling above about 420° F., are withdrawn from the bottom of tower 131 through conduit 136, pass through the heat exchanger 130 and thence to storage through line 137. These polymers may be used as a charging stock for a cracking unit where they are cracked into hydrocarbons boiling within the gasoline boiling range. The products in the middle portion of the tower are withdrawn from trap-out plate 138 by line 139 and passed to a side stripper similar to that shown in Figure 1. The bottoms from this side stripper constitute the fraction of polymers boiling within the gasoline range and the light products withdrawn from the top of the stripper are returned to the tower 131.

The gaseous products in the fractionating tower are withdrawn through line 140 and passed to the cooler 141 and thence to the reflux drum 142. The uncondensed materials are withdrawn from the top of the reflux drum through valved conduit 143. The condensate in the reflux drum is withdrawn through line 144 and passed to storage through valved conduit 145. A portion or all of this condensate may be passed through line 146 with the aid of pump 147 and returned to the top of the fractionating tower 131 for use as reflux. The conventional type of bubble trays 148 are used in tower 131 in order to assist in the fractionation of the constituents therein.

The amount of catalyst and pressure conditions employed in our process as shown by Figure 3, may be the same as those given in connection with Figure 1. By providing a second reaction coil in temperature regulator 115 and operating the same at a temperature below 200° F., we can recover the boron fluoride catalyst in the form of a boron fluoride-hydrocarbon complex. In addition to this feature, we are also able to polymerize those constituents which escape polymerization in reaction coils 104. By maintaining the temperature in reaction coils 104 above 300° F. and below 700° F., we are able to produce a very large amount of liquid polymers which boil within the gasoline boiling range.

Figure 4:
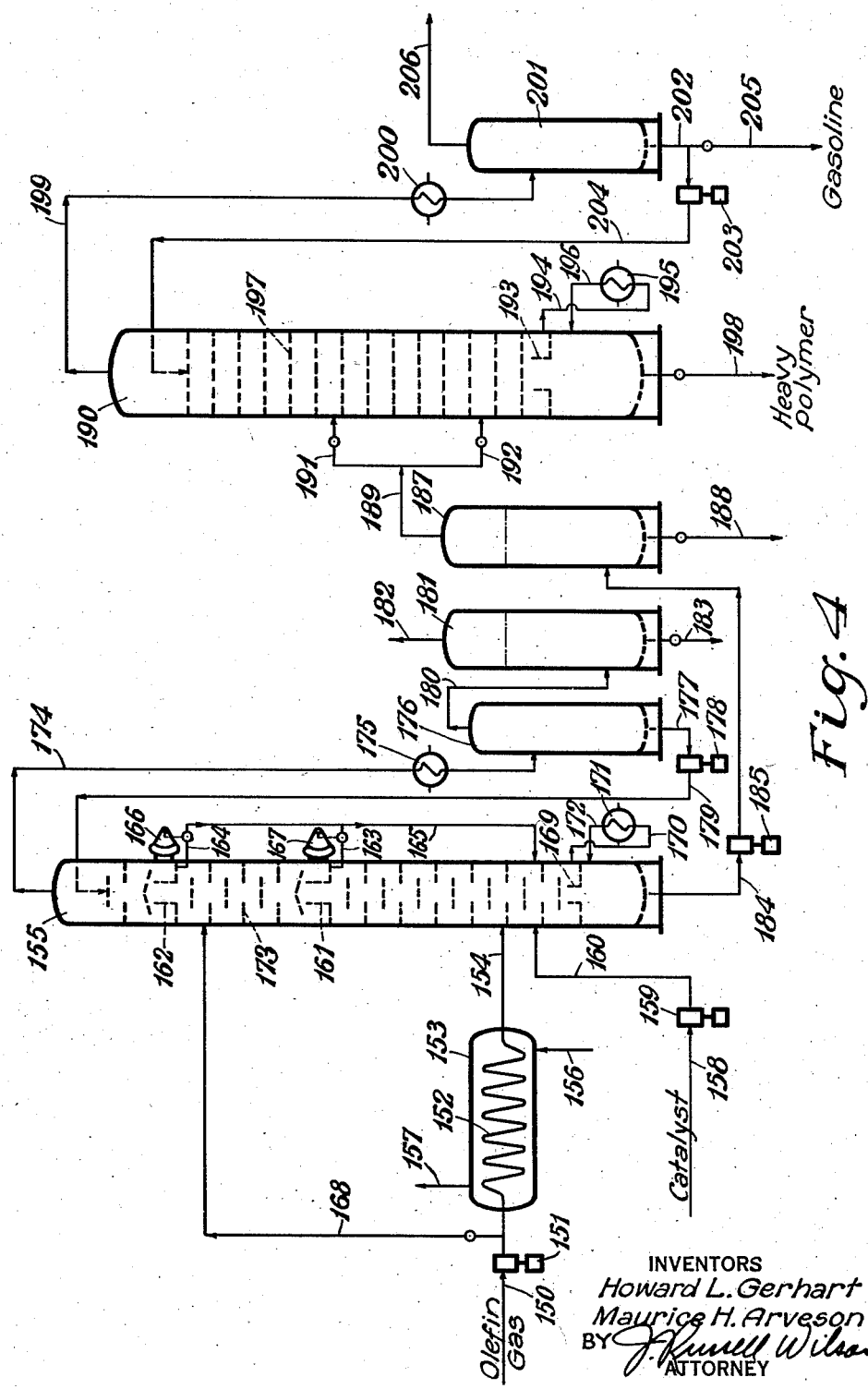
Figure 4 is still another flow diagram of a modification combining features of the process described in Figures 1 to 3.

Referring to Figure 4, the feed enters the system through line 150, is raised by pump or compressor 151 to the desired pressure, passed through the coils 152 in the heater 153 and then passed through conduit 154 to the lower part of the tower or reactor 155. Steam, hot oil or any suitable heating means may be circulated around the coils in heater 153 by conduits 156 and 157 in order to heat the feed gases. The boron fluoride catalyst enters the system through conduit 158, pump 159 and passed by conduit 160 to the lower part of tower 155 and there permitted to mix with the feed gases. The temperature maintained in the lower part of tower 155 ranges from about 300 to 500° F. The remaining part of the tower is maintained at progressively lower temperatures and the top part of the tower is maintained at a temperature below about 150° F. and preferably within the range of 150–80° F.

The unsaturated gases are polymerized by the boron fluoride in the lower part of tower 155 and the liquid polymers resulting from this reaction condense and pass to the bottom of the tower where they are withdrawn and treated as hereinafter indicated. The boron fluoride-hydrocarbon complex is not stable at temperatures above about 200° F. and consequently this complex does not exist to an appreciable extent in the reaction zone which makes up the lower space in tower 155. The unreacted gases and boron fluoride pass up the tower to zones which are maintained at temperatures below 200° F. and preferably below 150° F. In these cooler zones the boron fluoride forms the boron fluoride-hydrocarbon complex which condenses and is collected by the trap-out plates 161 and 162. Draw-off lines 163 and 164 communicate with the trap-out plates and pass the complex to conduit 165 which returns the same to the hot reaction zone in the lower part of the tower. Conduit 165 enters the tower at about but below the point where the feed gases and boron fluoride enter the tower. At the temperature maintained in the lower part of tower 155, the boron fluoride hydrocarbon complex is decomposed into free polymer and boron fluoride. The boron fluoride again passes up through the tower to further polymerize unsaturated hydrocarbons and form the boron fluoride-hydrocarbon complex. Float valves 166 and 167 are provided in lines 163 and 164 for the purpose of maintaining a liquid level on the trap-out plates.

A portion of the feed gases in line 150 are passed through valved conduit 168 to a section of the tower up above the middle portion and there permitted to react with the boron fluoride. By increasing the concentration of olefins in the upper part of tower 155, we can insure the formation of the boron fluoride-hydrocarbon complex with substantially all of the boron fluoride in the upper part of the tower. Varying amounts of feed gas may be diverted through line 168 and the ratio between the feed gas passing through the heater 153 and conduit 168 may vary over a wide range but, generally, the amount of feed gas introduced into the system through line 168 should be only sufficient to insure that only a small amount of boron fluoride escapes through line 174. An economic balance must be struck between olefin and boron fluoride lo....

A trap-out plate 169 is provided near the bottom of tower 155 where a part of the polymer is withdrawn through line 170, heated in the reboiler 171 and returned to the lower part of the tower through line 172. The reboiler insures the maintenance of a temperature above 300 F. in the lower part of tower 155 and also assists in removing entrained boron fluoride from the liquid polymers.

Tower 155 may be operated at pressures ranging from about 100 to nearly 500 lbs. per square inch and baffle trays or bubble plates 173 may be provided in the tower in order to assist in contacting the boron fluoride gas with the unreacted gases and to also assist in fractionating the liquid materials from the unreacted gases.

The overhead from tower 155 is passed by line 174 to the cooler 175 and thence to the reflux drum 176. The condensate in the lower part of drum 176 is withdrawn through line 177 by pump 178 and returned through line 179 to the top of tower 155 and used as reflux. An intercooler or reflux coils may also be provided in the top part of the tower 155. The overhead from reflux drum 176 is withdrawn through line 180 and passed to the bottom part of the washer 181 where it is permitted to pass up through a boron fluoride absorbing agent to remove traces of boron fluoride contained in the unreacted gases. The scrubbed gases collect above the liquid level in washer 181 and are withdrawn through line 182. A valved draw-off line or charge line 183 is provided in the lower part of the washer.

The liquid polymers in the bottom part of tower 155 are withdrawn through line 184 by pump or valve 185 and thence to the bottom part of the scrubber 187 containing an absorbing agent where the traces of boron fluoride are removed therefrom. A valved conduit 188 is provided in the lower part of washer 187 so that the contents thereof may be withdrawn from time to time or the washing medium withdrawn through line 188 may be recycled to the top of the scrubber 187 and again used to scrub the liquid polymers.

The liquid polymers withdrawn from the top of washer 187 through conduit 189 are introduced into the fractionating tower 190 through valved conduits 191 or 192. The fractionating tower 190 is of the conventional type and may be operated in a variety of ways. In fact, fractionating tower 190 may be operated in substantially the same manner as the fractionating tower 91 of Figure 2. Tower 190 separates the liquid polymer into two fractions one of which boils above the gasoline boiling range and the other containing hydrocarbons which boil within and below the gasoline boiling range. A trapout plate 193 is provided in the lower part of the tower and the heavy polymers are withdrawn through line 194, heated in the reboiler 195 and returned to the bottom part of the tower through line 196. The heat supplied by the reboiler 195 is sufficient to fractionate the constituents in the tower and suitable fractionating means such as baffle plates and bubble plates 197 are provided in the tower in order to assist fractionation. Liquid heavy polymers are withdrawn from the bottom of fractionating tower 190 through valved conduit 198.

The overhead from fractionating tower 190 passes through line 199 to the cooler 200 and thence to the reflux drum 201. Liquid condensate is withdrawn from the bottom of reflux drum 201 by conduit 202 and a part of this condensate is forced by pump 203 through conduit 204 to the top part of the fractionating tower 190 and used as reflux. The remainder of the condensate withdrawn through line 202, is passed to storage through valved conduit 205 as polymerized gasoline. If desired, this gasoline may be further fractionated and blended with straight-run or cracked gasoline for use as motor fuel. The uncondensed gases in the top part of reflux drum 201 are withdrawn through conduit 206.

The amount of boron fluoride employed to polymerize the unsaturated hydrocarbons may vary over a wide range but generally from about .002 to 0.10 cu. ft. of boron fluoride should be present in tower 155 for each cubic foot of space contained therein. Since the boron fluoride-hydrocarbon complex is broken down into boron fluoride and polymer, we are able to recycle this boron fluoride and thereby avoid the necessity of continuously adding boron fluoride catalyst to the system through line 158. Small amounts of boron fluoride may be added at intervals to compensate for losses.

Four methods of operation of a boron fluoride catalytic gas polymerization process have been described. In all cases temperatures distinctly above the boron fluoride-hydrocarbon complex decomposition temperature have been used for the main polymerization reaction. In all cases the formation of the boron fluoride-hydrocarbon complex has been used to prevent the loss of boron fluoride from the system.

In connection with Figures 1 and 2, hydrocarbon products from any one of three sources or combinations thereof have been used to contact the boron fluoride to form the boron fluoride-hydrocarbon complex. These three sources are: first, raw polymer; second, heavy gasoline-free polymer; and third, hydrocarbons from the decomposition of the boron fluoride-hydrocarbon complex.

In connection with Figures 3 and 4, the use of a second polymerization step with further fresh feed at a temperature below the decomposition temperature of the boron fluoride-hydrocarbon complex has been used to form the boron fluoride-hydrocarbon complex and avoid loss of boron fluoride.

We further contemplate a combination of these two methods, polymer scrubbing and a second polymerization, to prevent the loss of boron fluoride.

It should be noted that the operations shown in Figures 2 and 4 have a distinct advantage in that polymers formed are withdrawn and contacted with an absorbing agent at the temperature of reaction with no opportunity for further polymerization at lower temperatures. Thus a higher yield of material in the gasoline boiling range may be obtained by these operations.

In all cases it is contemplated that substantially propane-free butane will be recovered and used to blend with gasoline stocks from this and other sources to produce finished gasoline.

While we have described our process with reference to four different types of operation and set forth certain temperature and pressure conditions, it should be understood that these conditions may be varied somewhat without departing from the scope of our invention. Also, the amount of boron fluoride gas used to polymerize the hydrocarbons may vary considerably but the amounts herein specified with respect to the four types of operation will give satisfactory results. If desired, a small amount of hydrofluoric acid may be added to the boron fluoride catalyst. Generally, a small and preferably controlled amount of moisture in the feed gases tends to assist the polymerization reaction.

We claim:

1. The method of converting gaseous hydrocarbons containing components such as butylene and propylene into liquid products having a substantial fraction within the gasoline boiling range which method comprises introducing compressed gases containing olefins to a high temperature contacting zone maintained at a temperature of about 300 to 500° F. and a pressure of about 100 to 500 lbs./sq. in., introducing a small amount of boron fluoride gas into said zone, removing heavy polymerization products from the lower part of said zone, passing boron fluoride and gaseous products into a low temperature zone for further reaction, whereby boron fluoride hydrocarbon complexes are formed, returning said boron fluoride complexes from said low temperature zone to the zone which is maintained at 300 to 500° F. for the recovery of boron fluoride therefrom, scrubbing the liquid products of the reaction to remove traces of boron fluoride and fractionating said liquid products to separate components of the gasoline boiling range from higher boiling and lower boiling components.

2. The method of claim 1 which includes the step of introducing polymerized materials from the lower part of the initial contacting zone to the low temperature zone for reaction with boron fluoride therein to form the boron fluoride complex.

3. The method of converting hydrocarbon gases containing olefins such as butylene and propylene into liquids, a substantial portion of which are within the gasoline boiling range, which method comprises contacting said gases with boron fluoride at a temperature of from about 250 to 500° F., cooling the contacted materials to a temperature below 200° F., separating polymerized products from boron fluoride and unreacted gases, contacting said boron fluoride and unreacted gases with further amounts of olefinic gases at a temperature of from 50 to 200° F. whereby polymerization products and boron fluoride complexes are formed, separating polymerization products from boron fluoride complexes, and fractionating the polymerization products to separate components boiling within the gasoline boiling range and the lighter and heavier products respectively.

4. The method of claim 3 which includes the step of returning the separated boron fluoride complex to the initial contacting zone.

5. The method of claim 3 which includes the steps of decomposing the separated complex, recovering gasoline from the hydrocarbon material separated from said complex and returning boron fluoride separated from said complex to the initial contacting step.

6. The method of converting olefinic gases into liquid products which comprises contacting a portion of said olefinic gases with boron fluoride at a temperature higher than 300° F., contacting another portion with gaseous material leaving the first contacting step at a temperature below 200° F., thereby converting the boron fluoride in the second contacting step into a hydrocarbon boron fluoride complex, separating said complex from hydrocarbon material and decomposing said complex with heat into boron fluoride and additional hydrocarbon material, scrubbing and fractionating said hydrocarbon material to recover gasoline therefrom, and returning boron fluoride from said complex to the initial contacting step.

7. The process of converting an admixture of normally gaseous hydrocarbons containing olefins into liquid hydrocarbons, the steps comprising contacting under pressure in a reaction zone an admixture of normally gaseous hydrocarbons containing olefins with a boron halide catalyst at a temperature within the range of 300–700° F. to convert a portion of the hydrocarbons into liquid hydrocarbons, passing the unreacted gases admixed with the boron halide catalyst into a second reaction zone maintained at a temperature below 200° F. to effect the formation of a boron-halide-hydrocarbon complex, removing the boron-halide-hydrocarbon complex from the second reaction zone and heating it to a temperature above about 250° F. to decompose it into boron halide and liquid hydrocarbons, and recovering the liquid hydrocarbons produced in the process.

8. The process of claim 7 wherein boron fluoride is used as the catalyst.

9. The process of converting an admixture of normally gaseous hydrocarbons containing butylenes into liquid hydrocarbons, the steps comprising contacting under pressure in a reaction zone an admixture of normally gaseous hydrocarbons containing butylenes with a boron halide catalyst at a temperature within the range of 300–500° F. to convert a portion of the hydrocarbons into liquid hydrocarbons, passing the unreacted gases admixed with boron halide catalyst into a second reaction zone maintained at a temperature below 150° F. to effect the formation of a boron-halide-hydrocarbon complex, removing the boron-halide-hydrocarbon complex from the second reaction zone and heating it to a temperature above about 200° F. to decompose it into boron halide and liquid hydrocarbons and reusing the thus generated boron halide in the first reaction zone to effect further conversion, and recovering the liquid hydrocarbons produced in the process.

10. The method of claim 9 wherein about 0.002 to 0.1 cubic foot of boron fluoride are introduced into the first mentioned reaction zone for each cubic foot of gaseous hydrocarbons, the volume in both cases being based on gases at atmospheric pressure and 60° F.

11. The method of claim 9 wherein polymerized olefins are introduced into the second reaction zone to assist in the formation of the boron-fluoride-hydrocarbon complex.

12. The process of converting an admixture of normally gaseous hydrocarbons containing olefins into liquid hydrocarbons, the steps comprising contacting under pressure in a reaction zone an admixture of normally gaseous hydrocarbons containing olefins with a boron halide catalyst at a temperature within the range of 300–700° F. to convert a portion of the normally gaseous hydrocarbons into liquid hydrocarbons, passing the unreacted gases admixed with the boron halide catalyst into a second reaction zone maintained at a temperature below about 200° F. to effect the formation of a boron-halide-hydrocarbon complex, recycling a portion of the boron-halide-hydrocarbon complex to the first reaction zone where it is decomposed into boron halide and liquid hydrocarbons, and recovering the liquid hydrocarbons produced in the process.

13. The process of converting an admixture of normally gaseous hydrocarbons containing butylenes into liquid hydrocarbons, the steps comprising contacting under pressure in a reaction zone an admixture of normally gaseous hydrocarbons containing butylenes with boron fluoride at a temperature within the range of 300–500° F. to convert a portion of the hydrocarbons into liquid hydrocarbons, passing the unreacted hydrocarbons admixed with boron fluoride into a second reaction zone maintained at a temperature below 150° F. to effect the formation of a boron-fluoride-hydrocarbon complex, recycling a portion of the boron-fluoride-hydrocarbon complex to the first reaction zone where it is decomposed into boron fluoride and liquid hydrocarbons and the thus liberated boron fluoride catalyzes the conversion of the admixture of normally gaseous hydrocarbons containing butylene entering the system, recovering and fractionating the liquid hydrocarbons produced in the process.

14. The process of converting an admixture of normally gaseous hydrocarbons containing propylene and butylenes into liquid hydrocarbons, the steps comprising contacting under pressure in a reaction zone an admixture of normally gaseous hydrocarbons containing propylene and butylenes with boron fluoride at a temperature within the range of 300–700° F. to convert a portion of the hydrocarbons into liquid hydrocarbons, passing the products from the first reaction zone into a second reaction zone maintained at a temperature below 200° F. to effect the formation of a boron-fluoride-hydrocarbon complex, passing the liquid products from the second reaction zone into a separating zone wherein liquid hydrocarbons are separated from the boron-fluoride-hydrocarbon complex, heating the boron-fluoride-hydrocarbon complex to decompose it into boron fluoride and liquid hydrocarbons and recycling the thus liberated boron fluoride to the first reaction zone, and recovering the liquid hydrocarbons produced in the process.

15. The process of converting an admixture of normally gaseous hydrocarbons containing propylene and butylenes into liquid hydrocarbons, the steps comprising introducing the admixture of gases and gaseous boron fluoride into the lower part of an upright elongated reaction zone wherein a part of the hydrocarbons are converted by the boron fluoride into liquid hydrocarbons, maintaining the temperature in the lower part of said reaction zone within the range of 300–500° F. and maintaining the temperature in the top part of said reaction zone below 200° F., passing the unreacted gases and boron fluoride to the upper part of said reaction zone and also introducing into the upper part of said reaction zone an admixture of normally gaseous hydrocarbons containing propylene and butylenes wherein the boron fluoride and unsaturated hydrocarbons react to form a boron-fluoride-hydrocarbon complex compound, returning the boron-fluoride-hydrocarbon compound to the lower part of said reaction zone where it is decomposed into boron fluoride and liquid hydrocarbons, withdrawing unreacted gases from the top part of said zone and withdrawing liquid hydrocarbons from the lower part of said zone.

HOWARD L. GERHART.
MAURICE H. ARVESON.